April 12, 1966   A. L. KORR   3,245,338
FOOD CONTAINER
Filed Jan. 23, 1964

INVENTOR.
ABRAHAM L. KORR
BY Arthur H. Seidel
ATTORNEY

3,245,338
FOOD CONTAINER
Abraham L. Korr, 8712 Hickory Drive, Philadelphia, Pa.
Filed Jan. 23, 1964, Ser. No. 339,622
7 Claims. (Cl. 99—358)

This invention primarily relates to a new and improved food container within which food is to be electrically cooked and/or heated.

In the past, it was difficult to cook and/or heat foods by electrical resistance methods except by directly impaling the food on suitably positioned electrodes. Cold spots and/or burning of the food usually resulted by the use of the impaling method. Additionally, non-solid foods such as soup, pot-pie, vegetables, and the like, could not be heated uniformly and rapidly by the electrical resistance method.

The present invention resides in the disclosure of a food container which is specifically adapted to be used with an electrical resistance method for cooking and/or heating the food within the container. In brief, the invention comprises a container having opposite side walls treated or otherwise provided with an electrically conducting material. The electrically conducting material on the container is so-located that it can be placed in contact with a pair of electrodes. The food in the container is in electrical contact with the electrically conducting material of the side walls. Therefore, upon the passage of electric current through the electrodes, current will be conducted through the opposite sides of the food container and through the food whereby the food can be cooked and/or heated.

The electrically conducting material on the side walls of the container is also treated with a coating of plastic material. This enables the food container to receive a cover element which may be rigidly adhered thereto by heat sealing methods. Accordingly, the package comprising the subject matter of the present invention may be shipped to the ultimate consumer with food already disposed therein. It will only be necessary for the consumer to place the package as obtained from the shipper into a suitable oven having electrodes which may be placed in contact with the electric conducting material of the package for cooking and/or heating the food.

Therefore, it is the primary object of this invention to disclose a new and improved food container for electrically heating and/or cooking foods therein.

A further object of this invention is to disclose a food container which has suitable large contact surfaces for the passage of electric current to the interior of the container whereby food within the container can be connected to this source of electric current.

Yet a more specific object of this invention is to disclose a food container which may be shipped from a food processor to the ultimate consumer who may cook and/or heat foods disposed within the container by merely disposing the container directly into a suitable oven.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
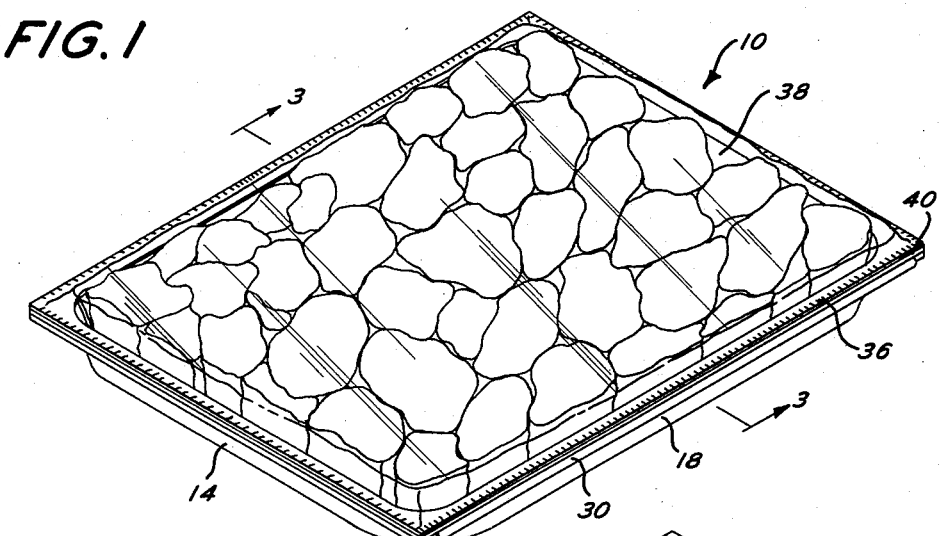
FIGURE 1 is a perspective view of the food container comprising the subject matter of the instant invention.
Figure 2:
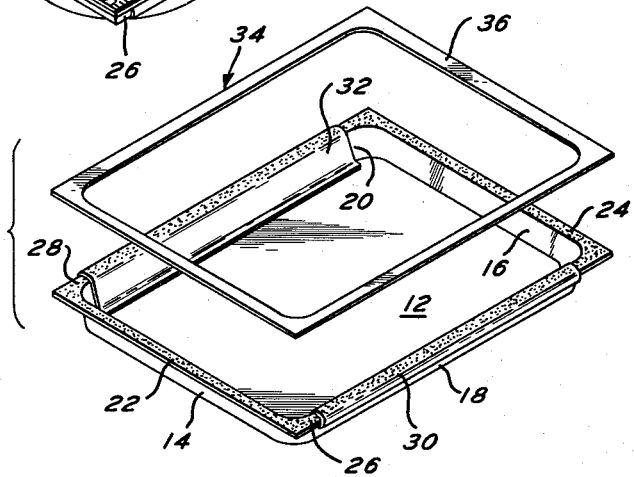
FIGURE 2 is an exploded perspective view of the food container in FIGURE 1.
Figure 3:
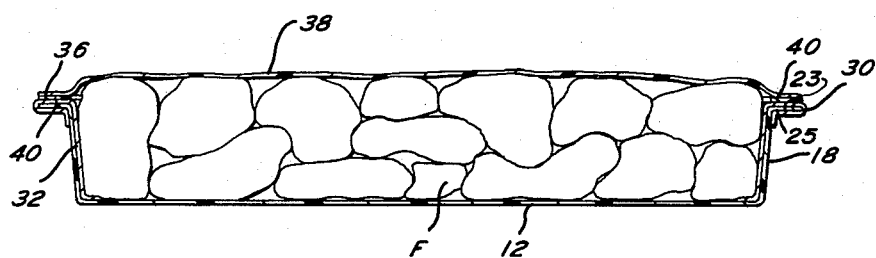
FIGURE 3 is a cross sectional view taken substantially along the plane indicated by the line 3—3 in FIGURE 1.

Referring now to the drawing in detail, the food container comprising the subject matter of the instant invention is generally designated by the numeral 10. The container 10 consists of a bottom wall 12, oppositely disposed end walls 14 and 16, and oppositely disposed side walls 18 and 20. This container, as just discussed, may be formed by molding a non-conducting plastic material such as polyethylene.

Each of the walls of the container may have an integral outwardly extending flange molded therewith. Thus, the end walls 14 and 16 are provided with oppositely directed flanges 22 and 24 while the side walls 18 and 20 of the container are provided with oppositely extending flanges 26 and 28. Each of the flanges 22, 24, 26, 28 has an upper surface 23 and a lower surface 25.

The side walls 18 and 20 of the food container 10 have metal foil coatings 30 and 32 respectively wrapped from the inside of the side walls over the upper and lower surfaces of the respective flanges connected to the side walls and terminating in abutment with the outer surfaces of the side walls. It should be understood that the metal foil layers 30 and 32 may be adhesively coated to the side walls or they may comprise a thin film suitably adhered to the container 10. The foil coatings 30 and 32 are formed from a good electrical conducting material.

Suitable electrodes may then be placed against the foil coatings 30, 32 along the outside surface of the side walls 18 and 20. When electricity is supplied to the electrodes, current will pass through the electrical conductive coatings into the interior of the food container 10. This current will then pass through the food F within the container thus heating and/or cooking it a desired amount.

By virtue of the fact that the coatings extend completely along the side walls of the container, uniform cooking of all food particles within the container is effected. This type of container can also be utilized to heat and/or cook by electrical resistance such non-solid foods as stews, pot-pies, vegetables and the like.

The container of the present invention is further adapted to be shipped to the consumer who need only place the container within a suitable oven to effect heating and/or cooking Therefore, the flanges 22–28 and the coating portions which are wrapped about the flanges of the side walls 18 and 20 are coated with a layer of a heat sensitive adhesive 40. For example, this coating may be polyethylene or vinyl. A cover element 34 including a rectangular frame 36 may then be disposed on the flanges 22–28 and conductive coatings 30, 32 and heat sealed thereto after food F has been placed within the container. It will be noted that portions of the conductive coatings 30 and 32 will remain exposed for electrical contact. The whole package may then be shipped to the consumer.

The cover element 34 is provided with a flexible and transparent window 38 wherein the type of food within the food container 10 may easily be ascertained.

Alternatively, the cover element 34 may be made of vinyl or polyethylene for heat sealing.

It should thus be appreciated that an integral food container has been disclosed which may be shipped directly from a food distributor to a consumer. The food within the package is solidly sealed tight thereby preventing spoilage during shipment. To cook the food or heat the food, the cnsumer need only place the container within a suitable oven provided with current carrying electrodes.

The present invention may be embodied in other specific forms without departing from the spirit or essential attributes thereof and, accordingly, reference should be made to the appended claims, rather than to the foregoing specification as indicating the scope of the invention.

I claim:
1. A food container comprising a non-conductive main body including a cavity defined by at least one pair of oppositely disposed side walls, an outwardly directed flange forming an extension of each of said oppositely disposed side walls, an electrically conducting film covering at least a portion of each flange and oppositely disposed side walls from the exterior to the interior of said cavity, and a coating of heat sealing material applied to said flanges and electrically conducting film covering each flange said electrically conducting film having an exposed portion for electrical contact.

2. The food container of claim 1 including a cover of flexible material adapted to be heat sealed to said flanges.

3. The food container of claim 2 wherein said cover includes a transparent window.

4. A food container comprising a non-conductive main body including a cavity defined by at least one pair of oppositely disposed side walls, an outwardly directed flange forming an extension of each of said oppositely disposed side walls, said flange having an upper and a lower surface, a strip of electrically conducting foil covering at least a portion of each flange and oppositely disposed side walls from the exterior to the interior of said cavity, said strip of electrically conducting foil extending from said upper to said lower surface of said flange, and a coating of heat sealing material applied to said flanges and electrically conducting foil covering each flange.

5. A food container comprising a non-conductive main body including a cavity defined by at least one pair of oppositely disposed side walls, an outwardly directed flange forming an extension of each of said oppositely disposed side walls, said flange having an upper and a lower surface, an electrically conducting film covering at least a portion of each flange and oppositely disposed side walls from the exterior to the interior of said cavity, said electrically conducting film extending from said upper to said lower surface of said flange, and an adhesive coating applied to said flanges and said electrically conducting film covering each flange.

6. A food container comprising a non-conductive bottom wall and a continuous non-conductive side wall surrounding the periphery of said bottom wall integral therewith, said bottom wall and said side wall defining a cavity for receiving food, an outwardly extending flange forming an extension of said side wall, said flange having upper and lower surfaces, a plurality of continuous electrically conducting films overlying portions of said side wall and said flange and disposed toward the inside of the container, said films extending from the junction of said bottom wall and said side wall, over said upper and said lower surfaces of said flange.

7. A food container in accordance with claim 6 including heat sealing material applied to said upper surface of said flange and said electrically conducting film on said upper surface, and a cover of flexible material adapted to be heat sealed to said flange.

References Cited by the Examiner

UNITED STATES PATENTS

| | | | |
|---|---|---|---|
| 1,961,681 | 6/1934 | Bohart | 99—358 X |
| 2,200,405 | 5/1940 | Watson | 99—358 |
| 2,474,390 | 6/1949 | Aff | 99—358 X |
| 2,939,793 | 6/1960 | Richman. | |
| 3,054,679 | 9/1962 | Bradford | 99—171 |
| 3,062,663 | 11/1962 | Furgal et al. | 99—358 X |
| 3,069,273 | 12/1962 | Wayne | 99—171 |
| 3,093,287 | 6/1963 | Stark | 229—3.1 |
| 3,167,431 | 1/1965 | Lee et al. | 99—358 XR |

FOREIGN PATENTS 971,890   10/1964   Great Britain.

IRVING BUNEVICH, *Primary Examiner.*

BILLY J. WILHITE, *Assistant Examiner.*